US008706875B2

(12) United States Patent
Froeding et al.

(10) Patent No.: US 8,706,875 B2
(45) Date of Patent: Apr. 22, 2014

(54) SHARING ACCESS TO APPLICATION LOCATED ON A SMART CARD FOR CLIENTS IN PARALLEL

(75) Inventors: Emil Nicolaj Froeding, Koebenhavn S (DK); Joergen Moeller Ilsoee, Valby (DK); Peter Vestergaard, Humlebaek (DK)

(73) Assignee: Nokia Corporation, Espoo (FI)

( * ) Notice: Subject to any disclaimer, the term of this patent is extended or adjusted under 35 U.S.C. 154(b) by 339 days.

(21) Appl. No.: 13/139,627

(22) PCT Filed: Dec. 16, 2008

(86) PCT No.: PCT/IB2008/003505
§ 371 (c)(1),
(2), (4) Date: Jun. 14, 2011

(87) PCT Pub. No.: WO2010/070373
PCT Pub. Date: Jun. 24, 2010

(65) Prior Publication Data
US 2011/0320600 A1    Dec. 29, 2011

(51) Int. Cl.
*G06F 15/173* (2006.01)
(52) U.S. Cl.
USPC ............ 709/225; 709/203; 709/229; 715/743
(58) Field of Classification Search
USPC .......... 709/203, 223, 225, 229; 715/733, 741, 715/743
See application file for complete search history.

(56) References Cited

U.S. PATENT DOCUMENTS

| 7,232,073 | B1 | 6/2007 | De Jong | |
| 2002/0029343 | A1* | 3/2002 | Kurita | 713/185 |
| 2002/0066792 | A1 | 6/2002 | Guthery et al. | |
| 2007/0057044 | A1* | 3/2007 | Uchiyama et al. | 235/380 |
| 2007/0235537 | A1* | 10/2007 | Yoneda et al. | 235/435 |
| 2008/0016214 | A1* | 1/2008 | Galluzzo et al. | 709/226 |
| 2008/0022043 | A1* | 1/2008 | Adams et al. | 711/115 |
| 2009/0276549 | A1 | 11/2009 | Zechlin et al. | |
| 2010/0071031 | A1* | 3/2010 | Carter et al. | 726/2 |

FOREIGN PATENT DOCUMENTS

| EP | 1954086 A1 | 8/2008 |
| WO | 01/86980 A1 | 11/2001 |
| WO | 2009/068088 A1 | 6/2009 |

OTHER PUBLICATIONS

Manninen, "UICC Server Feature and Protocol Description", Nokia UICC/Smart Card Documentation, Apr. 9, 2008, pp. 1-63.
Madsen, "Smart Card API Proposal", Devices R&D Common Technologies, v1.1, Mar. 13, 2008, 7 pages.
"Smart Cards; UICC-Terminal interface; Physical and logical characteristics (Release 7)", ETSI TS 102 221, v7.11.0, Jul. 2008, pp. 1-160.
"Smart Cards; UICC-Terminal interface;Physical and logical characteristics (Release 7)", ETSI TS 102 221, v7.9.0, Jul. 2007, pp. 1-160.
International Search Report and Written Opinion received for corresponding Patent Cooperation Treaty Application No. PCT/IB2008/003505, dated Sep. 25, 2009, 10 pages.

(Continued)

*Primary Examiner* — Oanh Duong
(74) *Attorney, Agent, or Firm* — Mintz, Levin, Cohn, Ferris, Glovsky & Popeo, P.C.

(57) ABSTRACT

This patent application relates to a method, a computer program product, a computer program, an apparatus, and a system for sharing an access to at least one application located on a smart card unit.

15 Claims, 8 Drawing Sheets

(56) References Cited

OTHER PUBLICATIONS

Kehr et al., "Mobile Code As an Enabling Technology For Service-oriented Smartcard Middleware", International Symposium on Distributed Objects and Applications, 2000, pp. 119-130.

Deville et al., "Smart Card Operating Systems: Past, Present and Future", In Proceedings of the 5th NORDU/USENIX Conference, 2003, pp. 1-14.

Digital cellular telecommunications system (Phase 2+); Specification of the Subscriber Identity Module—Mobile Equipment (SIM-ME) interface (3GPP TS 51.011 version 4.15.0 Release 4), ETSI TS 151 011 V4.15.0 (Jun. 2005).

Universal Mobile Telecommunications System (UMTS); Characteristics of the Universal Subscriber Identity Module (USIM) application (3GPP TS 31.102 version 7.13.0 Release 7), ETSI TS 131 102 v7.13.0 (Oct. 2008).

* cited by examiner

SHARING ACCESS TO APPLICATION LOCATED ON A SMART CARD FOR CLIENTS IN PARALLEL

RELATED APPLICATION

This application was originally filed as Patent Cooperation Treaty Application No. PCT/IB2008/003505 filed Dec. 17, 2008.

FIELD OF THE APPLICATION

The present patent application relates to a method, a computer program product, a computer program, an apparatus, and a system for at least two clients using in parallel applications.

BACKGROUND OF THE APPLICATION

Mobile communications systems such as $2^{nd}$ generation (2G; for example GSM), $3^{rd}$ generation (3G; for example UMTS) use well-defined smart cards in addition to mobile devices. In UMTS, the smart card is called UICC (Universal Integrated Circuits Card).

A modern smart card like the UICC can offer a number of services to the host like the phone; for example it can, very naturally, offer the service of a smart card according the smart card device class. For instance, UICCs providing USB interchip interface may allow transfer of Subscriber Identity Module (SIM) Application Protocol Data Units (APDUs) by means of using smart card class.

In architectures of mobile devices, different engines have to access the UICC. For instance, in a mobile terminal a converged architecture may comprise a modem engine configured to perform phone functions and at least one further application engine for further function.

SUMMARY

Various aspects of the invention are set out in the claims.

According to a first aspect of the present invention, a method is described, comprising sharing an access to at least one application located on a smart card unit for at least two clients in parallel, wherein accessing of said at least one application can be performed by at least one of: referencing the application explicitly and referencing the application implicitly.

According to a second aspect of the present invention, an apparatus is described, comprising a server entity configured to share an access to at least one application located on a smart card unit for at least two clients in parallel, wherein accessing of said at least one application can be performed by at least one of referencing the application explicitly and referencing the application implicitly.

According to a third aspect to the present invention, a system is described, comprising an apparatus as described above, a smart card unit and at least two clients configured to communicate with the device for accessing at least one application on the smart card unit, wherein accessing of an application can be performed by at least one of referencing the application explicitly and referencing the application implicitly.

According to a fourth aspect of the present invention, a computer-readable storage medium encoded with instructions is described, that, when executed by a computer, perform sharing an access to at least one application located on a smart card unit for at least two clients in parallel, wherein accessing of an application can be performed by at least one of referencing the application explicitly and referencing the application implicitly.

According to a fifth aspect of the present invention, a computer program is described, the computer program comprising sharing an access to at least one application located on a smart card unit for at least two clients in parallel, wherein accessing of said at least one application can be performed by at least one of referencing the application explicitly and referencing the application implicitly.

According to a sixth aspect of the present invention, an information providing apparatus is described, comprising sharing an access to at least one application located on a smart card unit for at least two clients in parallel, wherein accessing of said at least one application can be performed by at least one of referencing the application explicitly and referencing the application implicitly.

According to a seventh aspect of the present invention, an apparatus means is described, the apparatus means comprising a server entity means configured to share an access to at least one application located on a smart card means for at least two clients in parallel, wherein accessing of said at least one application can be performed by at least one of referencing the application explicitly and referencing the application implicitly.

These and other aspects of the invention will be apparent from and elucidated with reference to the exemplary embodiments described hereinafter.

BRIEF DESCRIPTION OF THE FIGURES

For a more complete understanding of example embodiments of the present invention, reference is now made to the following descriptions taken in connection with the accompanying figures in which.

DETAILED DESCRIPTION

In the following detailed description, exemplary embodiments will be described.

Figure 1:
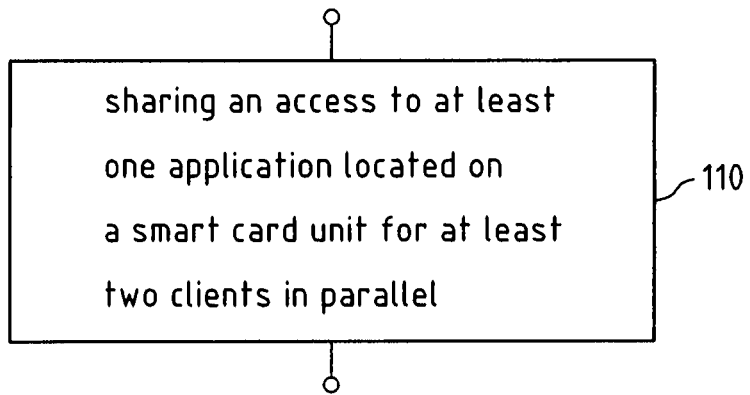
FIG. 1 depicts a schematic flowchart of a first exemplary embodiment of a method according to the present invention.

FIG. 1 depicts a schematic flowchart of a first exemplary embodiment of a method according to the present invention. This first exemplary embodiment depicted in FIG. 1 will now be explained together with the schematic block diagram of a first exemplary embodiment depicted in FIG. 2.

The method depicted in FIG. 1 comprises sharing an access to at least one application located on a smart card unit 230 for at least two clients 211, 212 in parallel, as indicated by reference sign 110, wherein accessing of an application can be performed by at least one of: referencing the application explicitly; and referencing the application implicitly. An application may be defined as set of security mechanisms, files, data and protocols that are residing and running on a smart card unit 230.

For instance, this smart card unit may represent a subscriber identity module (SIM), for example it may represent a universal integrated circuit card (UICC) implemented according to or based on ETSI TS 102 221 (Release 7, Version 7.9.0, 2007-07).

The at least one application may represent in an exemplary embodiment a telecom application and/or at least one further application. The telecom application may be the application that allows the mobile device network access. For example for SIM this application is specified in ETSI TS 51.011 and in another example for USIM it is specified in ETSI TS 31.102. But any other types of applications are suitable.

As an example, the first client 211 may represent a modem client which is a part of the modem of an apparatus like a mobile device that manages the part of the smart card application the modem uses. Furthermore, the second client 212 may represent a host client or an application client which is a part of the host that manages the part of the card application the host uses. It has to be noted that the invention is not restricted to only a first client 211 and a second client 212. In a further exemplary embodiment there may be more clients requesting access to the at least one application on the smart card unit 230 (not depicted in FIG. 2a).

The server entity 220 is configured to carry out the method depicted in FIG. 1, for example the server entity 220 may be configured to share an access to at least one application located on the smart card unit 230 for at least two clients 211, 212 in parallel. The server entity 220 may comprise a common interface 221 for performing the communication to the at least two clients 211, 212.

The first client 211 and the second client 212 are communicating via the server entity 220 with the smart card unit 230 wherein the server entity 220 is emulating a direct access to the smart card unit 230 via the common interface 221. Thus, as indicated in FIG. 1, access to a single one application of said at least one application can be shared in parallel to said at least two clients 211, 212.

For instance, access to a telecom application on the smart card unit 230 may be shared in parallel for the first client 211 and the second client 212.

The common interface 221 of the server entity 230 may enable that both clients 211 and 212 believe that they control the smart card unit 230 as the server entity 220 is handling access requests from the different clients 211 and 212 and is maintaining the communication to the smart card 230. Thus, the method and the server entity 220 may allow two or more independent customers to both seem to have control of the smart card unit 230, wherein each of these two or more independent customers is associated with one client of said at least two clients 211, 212.

As mentioned above, applications are pieces of code and data that is residing and running on the smart card unit 230. The applications on the smart card unit 230 may be identified by application IDs (AIDs). AIDs are part of an application data object which may be used for activating and addressing these applications. An application may be either explicitly or implicitly referenced.

In an exemplary embodiment an application may be activated by explicit selecting it with the AID. This sets the application's application dedicated file (ADF) as the current ADF. Furthermore, a current ADF may be referenced by file identifier (FID) with for example an implicit reference value '7FFF'. Applications may be selected and activated by a client of said at least two clients 211, 212 via the server entity 220.

Furthermore, the method may comprise tracking currently selected file information of an accessed application. For instance, the server entity 230 may track the currently selected dedicated file (DF) and elementary file (EF), as these may be present in every command.

Furthermore, the method may comprise granting sharing the access to one application according to access rules.

Figure 2A:
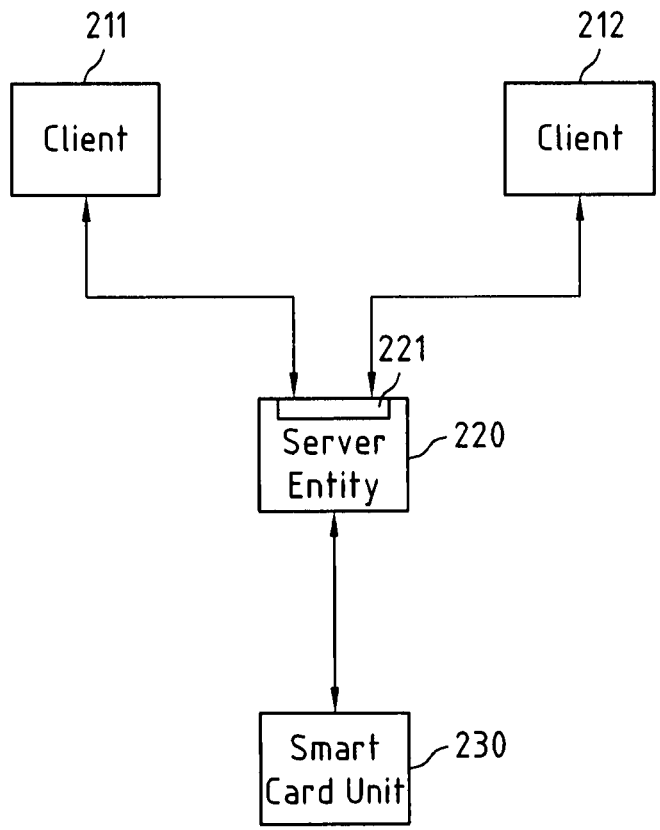
FIG. 2a depicts a schematic block diagram of a first exemplary embodiment of a system of the present invention.

The explanations described above with respect to the first exemplary method in FIG. 1 and the first exemplary embodiment in FIG. 2a also hold for the following exemplary embodiments and the respective components of these embodiments.

Figure 2B:
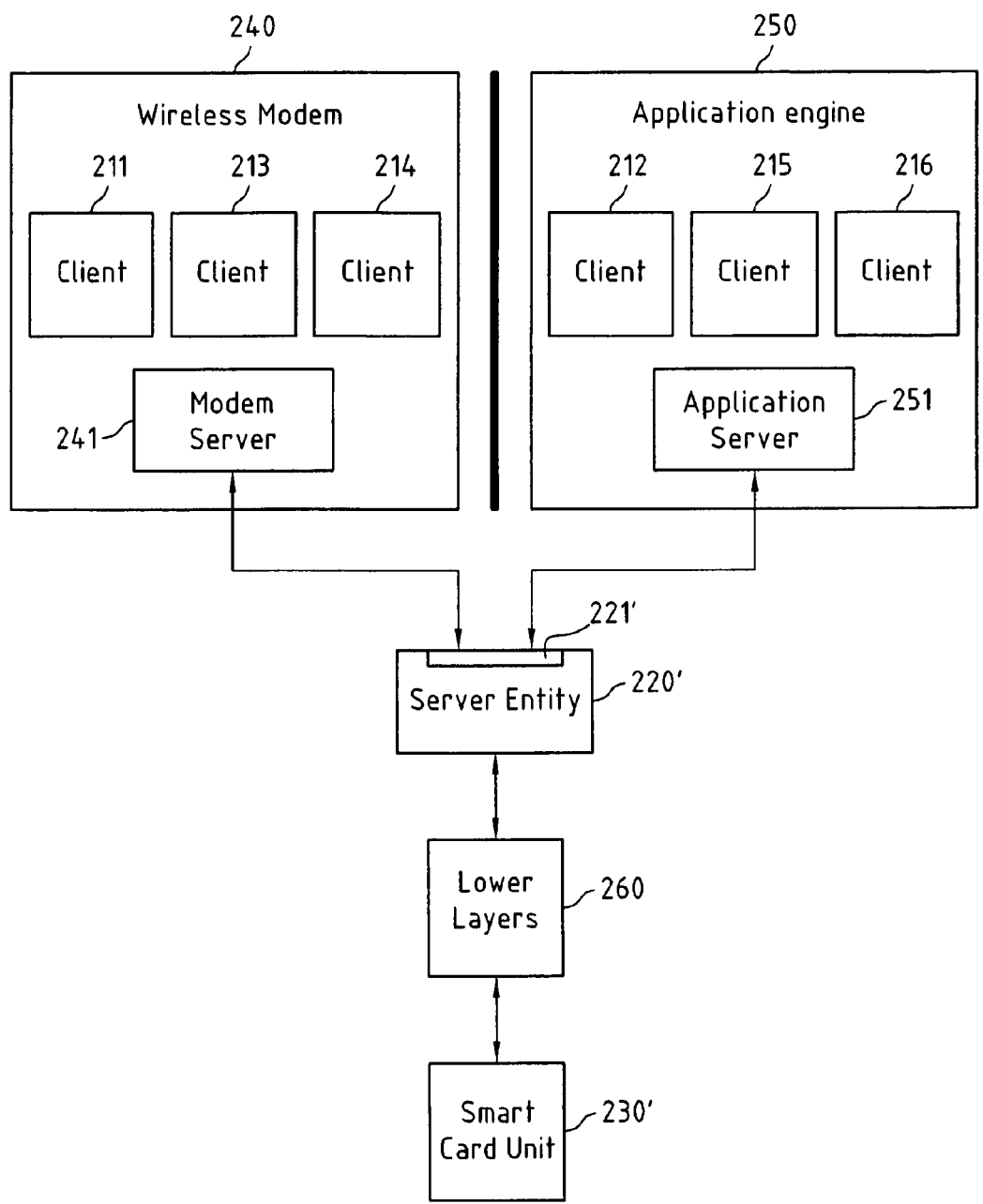
FIG. 2b depicts a schematic block diagram of a second exemplary embodiment of a system the present invention.

FIG. 2b depicts a schematic block diagram of a second exemplary embodiment of the present invention.

In this exemplary embodiment, an apparatus like a mobile device may comprise a wireless modem engine 240 for accessing a 2G mobile network (for example GSM) and/or a 3G network (for example UMTS) or for any other radio function, wherein this wireless modem engine 240 has to perform access to a smart card unit 230', for example a SIM card, in order give access to a network associated with the mobile device or to other functions of the mobile device by providing authentication. The access from the wireless modem engine 240' to the smart card unit 230' is realized via the server entity 220' and lower layers 260, wherein a modem server 241 communicating with clients 211, 213, 214 is placed in wireless modem 240 in order to communicate with the interface 221' of the server entity 220'.

The mobile device may comprise a further engine besides the wireless modem engine 240, wherein this further engine may represent an application engine 250 configured to perform host functionalities and/or applications on the mobile device. This application engine may also have to perform access to the smart card unit 230', for example in order for transferring files or internet protocol (IP) traffic or any other type of data traffic wherein a application server 251 communicating with clients 212, 215, 216 is placed in application engine 250 in order to communicate with the interface 221' of the server entity 220'.

In another exemplary embodiment the smart card unit 230' may represent an UICC, the server entity 220' may represent an UICC server 220'. For instance, the UICC server 220' may provide the interface to the smart card unit 230' for all information sent in APDU (Application Protocol Data Unit) format.

The server entity 220' may also be placed in the wireless modem 240, or it may be placed in the application engine 250. Furthermore, the server entity 220' may be connected to an ATK (application toolkit) server, wherein the ATK controls toolkit. For instance, there may be more dedicated toolkit implementation in the server entity. For instance, all responses from the smart card unit can be monitored for proactive commands, for example toolkit commands originated by the smart card unit.

Figure 3A:
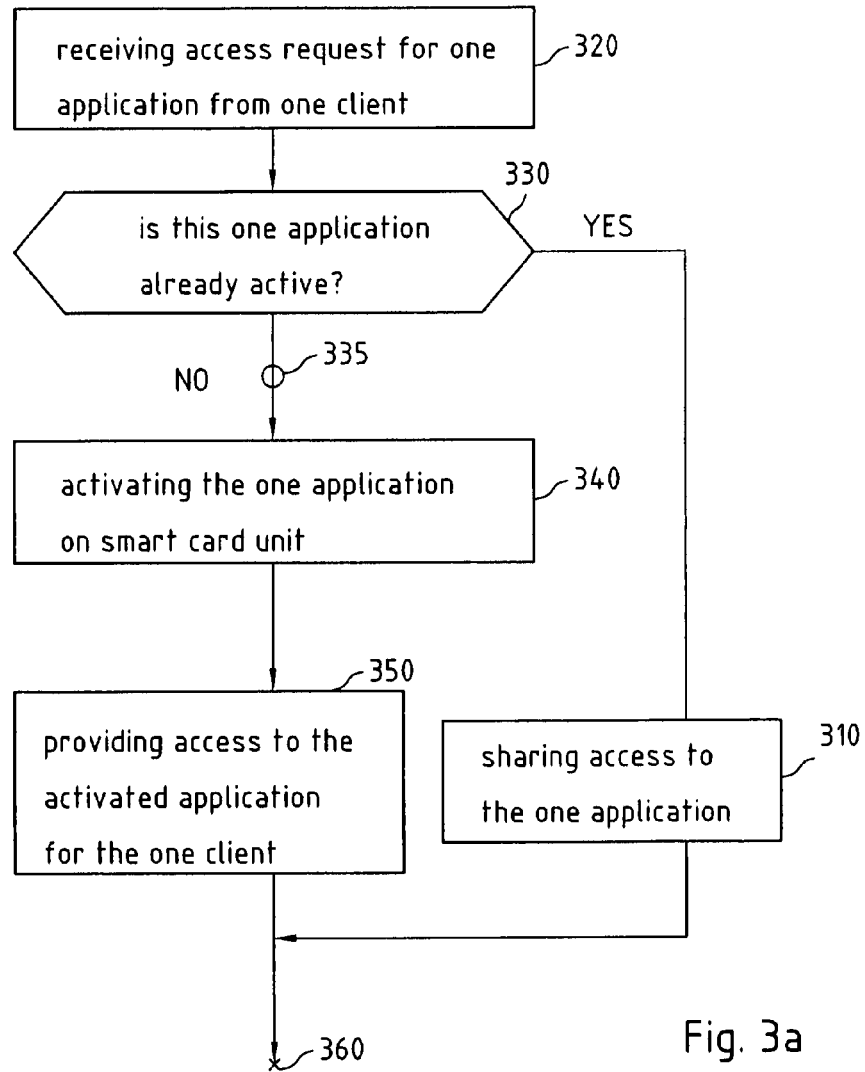
FIG. 3a depicts a schematic flowchart of a second exemplary embodiment of a method according to the present invention.

FIG. 3a depicts a schematic flowchart of a second exemplary embodiment of a method according to the present invention.

In this exemplary embodiment it is assumed that the server entity 220, 220' receives an access request for one application from one client of said at least two clients 211, 212, 213, 214, 215, 216 depicted in FIG. 2b (reference sign 320 in FIG. 3a). This access request may represent a request for executing an application command.

Then it may be checked by means of the server entity 220, 220' whether this one application is already active or not, as indicated by reference sign 330 in FIG. 3a. In case this application is already active, the access to the one application is shared in parallel to the one client and the at least one other client having access to the one application (reference sign 310 in FIG. 3a). Thus, access to this one application of said at least two applications are shared in parallel to at least two clients. For instance, former information with respect to this activated application has been tracked by the server entity 220, 220', so that this tracked information may be used by said one client. When a client has activated an application this client receives all indications about events occurring to the application.

There may exist different ways on how the server entity 220, 220' may react on an access request. For instance in an exemplary embodiment, the access request may trigger accessing cached data and for this reason no APDUs are sent from the server entity 220, 220' to the smart card unit 230, 230'.

When the one application is not already active, the activation of the one application on the smart card unit may be performed, as indicated by reference sign 340 in FIG. 3a, and access may be provided to the activated application for the one client. For instance, the communication for activating the application by one of the clients may be performed based on APDUs or commands send to the server entity 220, 220' in order to be send to smart card unit 230, 230'.

In point 360 of the flowchart, the method may wait for receiving another access request. In this case the method may proceed at reference sign 320.

Thus, the server entity 220, 220' may be configured to handle access requests for applications on the smart card unit 230, 230' received from anyone of the at least two clients, wherein the server entity 220, 220' provides an intelligent handling of such an access in order to enable that the clients sharing the application believe that they control the smart card unit 230, 230'.

Figure 3B:
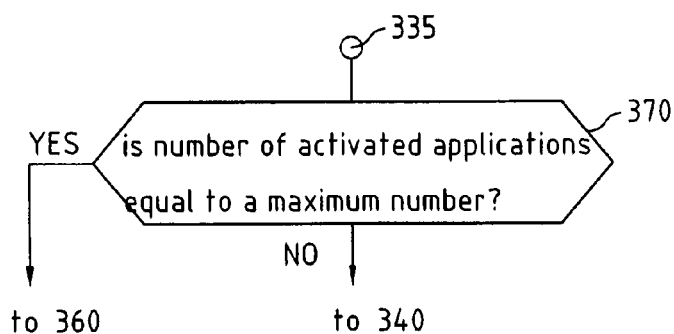
FIG. 3b depicts a schematic flowchart of a third exemplary embodiment of a method according to the present invention.

FIG. 3b depicts a schematic flowchart of a third exemplary embodiment of a method according to the present invention, wherein this third exemplary embodiment is based on the second exemplary embodiment shown in FIG. 3a.

In an exemplary embodiment, there may be a maximum number of applications that can be active in the smart card unit 230, 230' at the same time. This maximum number may be defined by the smart card unit 230, 230'.

Thus, at point 335 in the flowchart depicted in FIG. 3a, checking 370 whether the number of activated applications on the smart card unit 230, 230' is equal to a maximum number may be inserted, as indicated in FIG. 3b in conjunction with FIG. 3a.

When the maximum number of activated applications is reached, the method may directly jumps to point 360 without starting the selected on application. Otherwise, when the maximum number is not reached, the method may be proceeded with activating 340 the one application on the smart card unit, as mentioned above.

Thus, the server entity 220, 220' may be configured to avoid that maximum number of applications that can be active on the smart card unit 230, 230' is exceeded.

Figure 4:
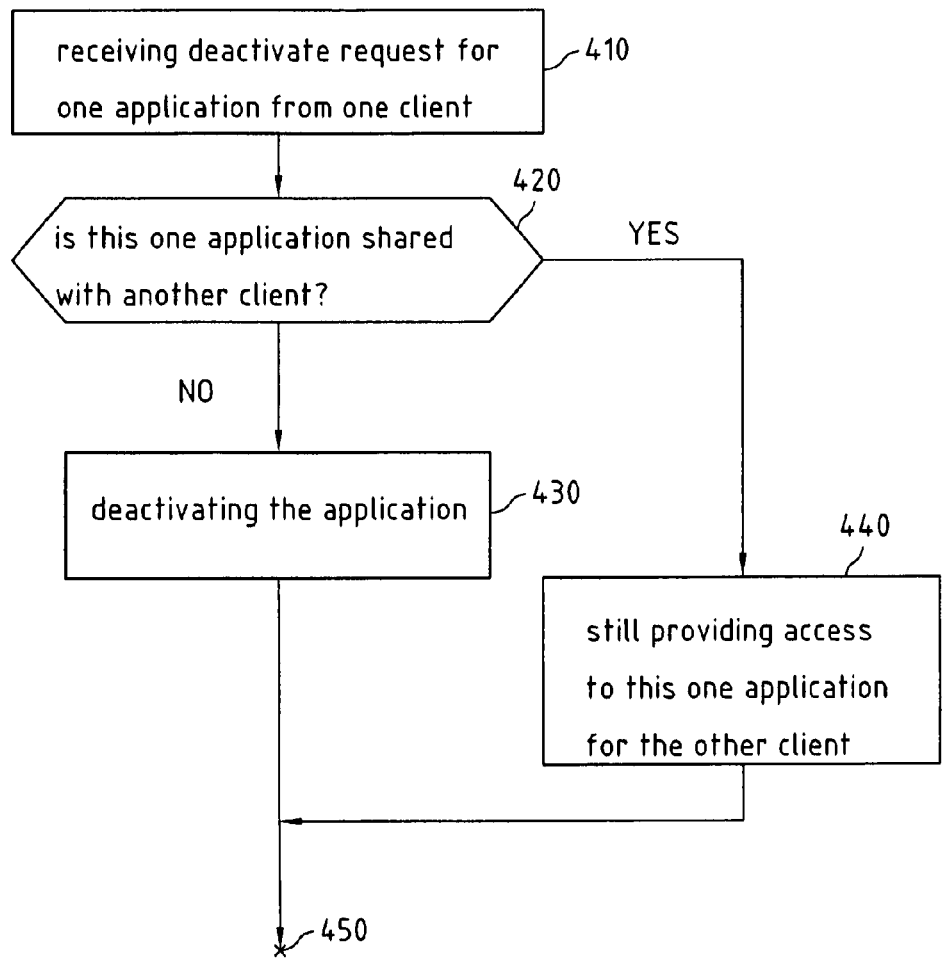
FIG. 4 depicts a schematic flowchart of a fourth exemplary embodiment of a method according to the present invention.

FIG. 4 depicts a schematic flowchart of a fourth exemplary embodiment of a method according to the present invention.

In this exemplary embodiment it is assumed that the server entity 220, 220' receives a deactivate request for one application from one client, as indicated by reference sign 410 in FIG. 4.

It is checked whether this one application is shared with another client (reference sign 420). If not, the application is deactivated, as indicated by reference sign 430. If this one application is shared with another client, the server entity 220, 220' still provides access to this one application for the other client, for example only the access to the one client is stopped and the parallel access reduces to a single access for the another client. In case there are a plurality of other clients accessing this one application, the shared access for these other clients in parallel may be maintained in 440.

Thus, the server entity 220, 220' may ensure that the application remains active as long as there is a client accessing this application.

In point 450 of the method depicted in FIG. 4, the server entity 220, 220' may wait for receiving another deactivate request or for receiving an activate request, for example as mentioned above with respect to FIG. 3a.

FIG. 5 depicts a schematic flowchart of a fifth exemplary embodiment of a method according to the present invention.

In this exemplary embodiment it is assumed that a first application on the smart card unit 230, 230' is already accessed, as indicated by reference sign 510. For instance, this access may be performed by means of the method depicted in FIG. 3a.

Then an access request for a second application may be received (reference sign 520) from one of the at least two clients 211 to 216.

It is checked whether this access request for the second application has a higher priority than the first application, for example granting this access request is based on access rules.

For instance, these access rules may define that an access request from a predetermined client 211,213,214 of said at least two clients 211 to 216 has higher priority than other clients 212,215,215. For instance, this predetermined client may represent the modem client 211 of a wireless modem. Furthermore, there may be a priority list for applications requests available. For example, only access requests from a modem based on commands or APDUs or the like from the modem, may be associated with a high priority.

In case the access request for the second application has higher priority than the first application, an interleaving of the first application may be performed (reference sign 540) in order to perform access to the second application immediately. Thus, service high access requests, for example high priority APDU's like for example authentication, may be performed immediately, thereby interleaving low priority APDU's like for example reading of icons.

If the access request for the second application has no higher priority, the method may proceed at point 550 without interleaving of accessing the first application. For instance, the server entity 220, 220' may wait until there is a natural time slot when accessing the first application, wherein the access of the second application can be performed in this natural time slot, or the server entity 220, 220' may wait until accessing the first application is finished.

Figure 5A:
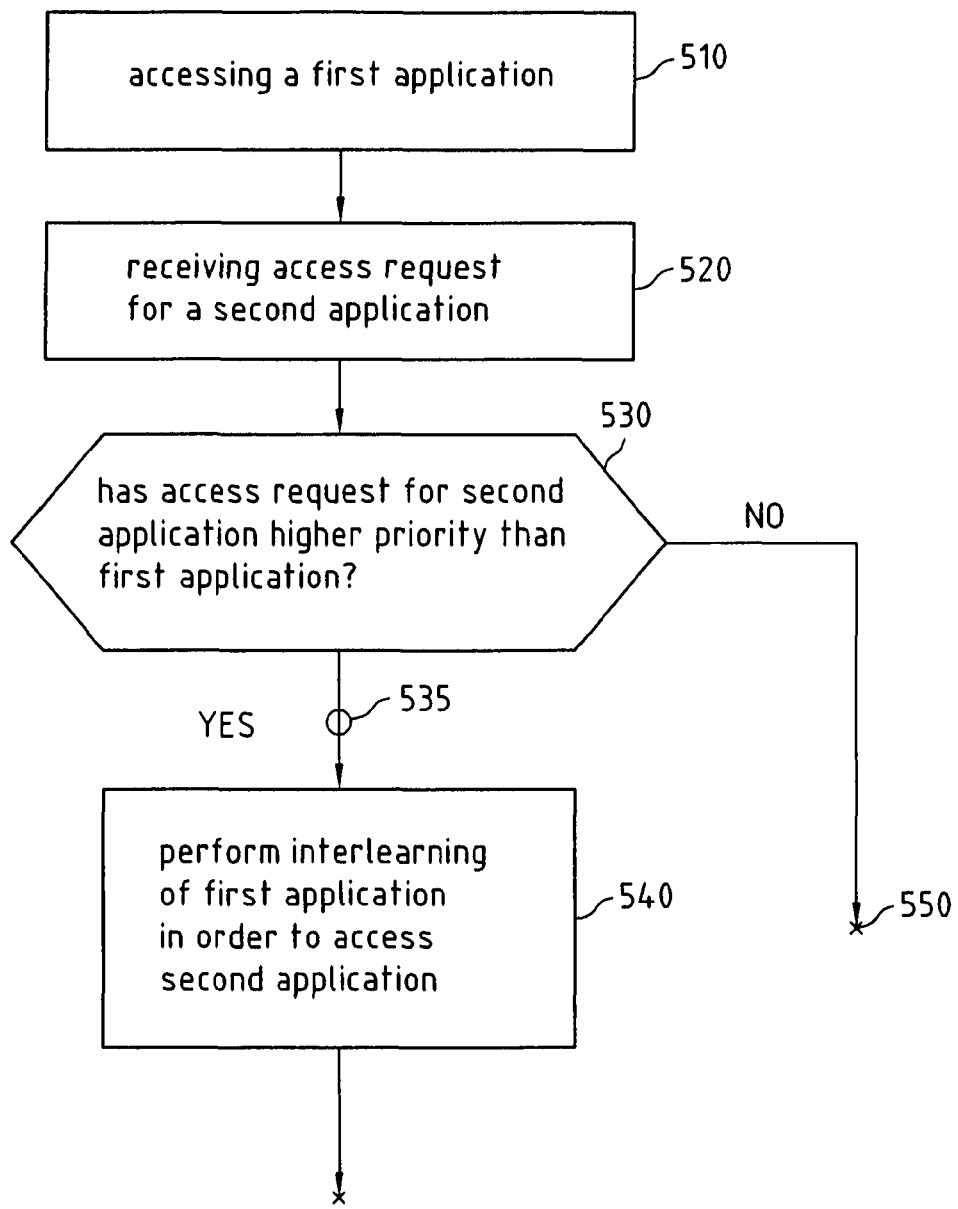
FIG. 5a depicts a schematic flowchart of a fifth exemplary embodiment of a method according to the present invention.
Figure 5B:
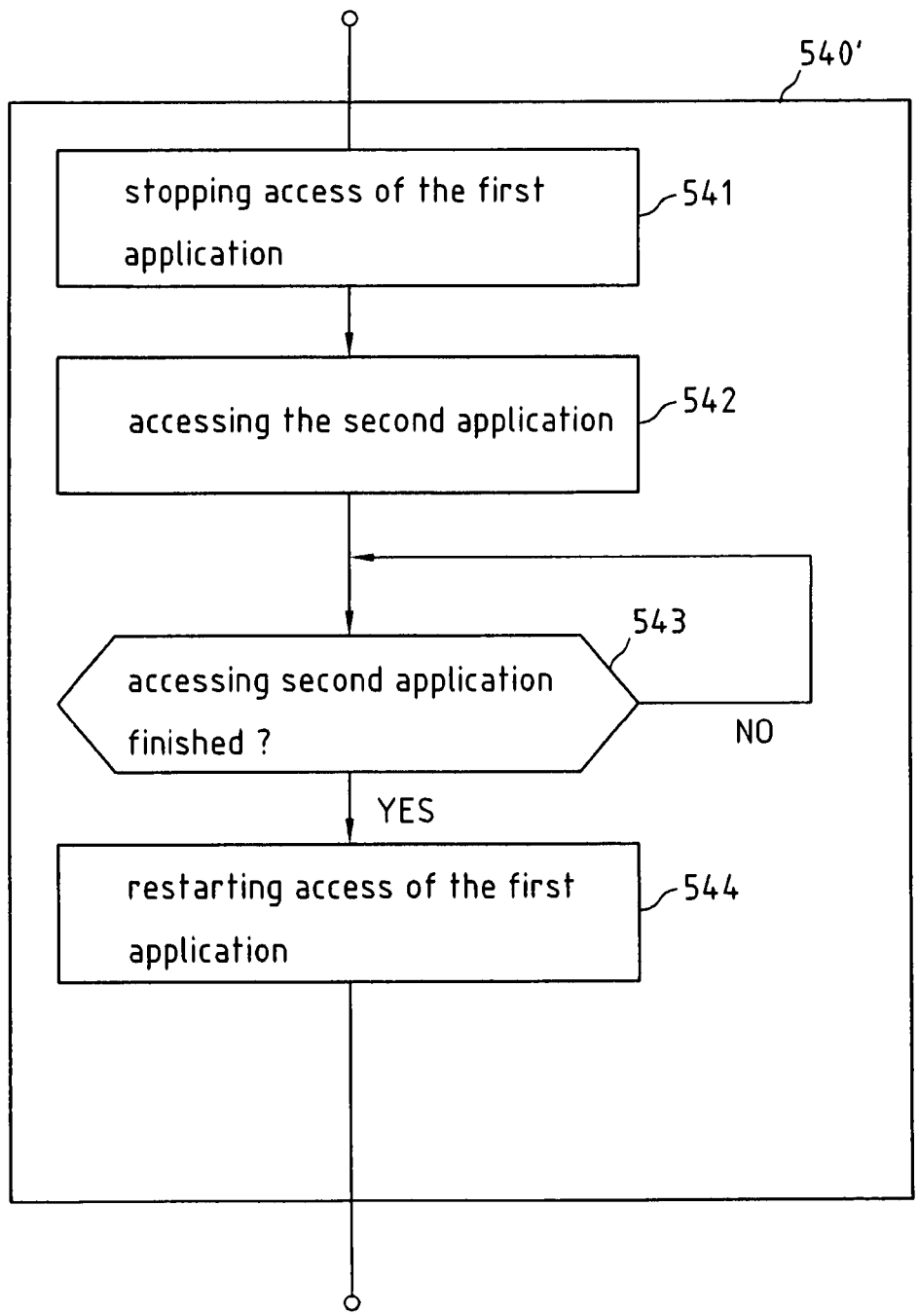
FIG. 5b depicts a schematic flowchart of an exemplary embodiment of an interleaving according to the present invention.

FIG. 5b depicts a schematic flowchart of an exemplary embodiment of an interleaving 540', which may be used for interleaving 540 presented in FIG. 5a.

In case of interleaved access of the first application, as indicated by reference sign 540 in FIG. 5*a*, the access of the first application is stopped. All relevant data concerning this access of the first application may be cached in the server entity 220, 220'.

Then accessing the second application on the smart card unit 230, 230' may be performed (reference sign 542). In case there are other applications (including the first application) currently active and the number of active applications would exceed the maximum number, the application having the lower priority of these other applications is deactivated before the second applications is accessed and activated on the smart card unit 230, 230'.

It may be checked whether accessing the second application is finished (reference sign 543), and if true, the accessing of the first application may be restarted and completed, as indicated by reference sign 544 in FIG. 5*b*.

Thus, high prioritized accessing may be performed immediately while interleaving the access of the first application. For instance, this may be used to avoid that modem critical commands are blocked by low-prioritized commands requiring APDU sequences lasting a long time.

Figure 6:
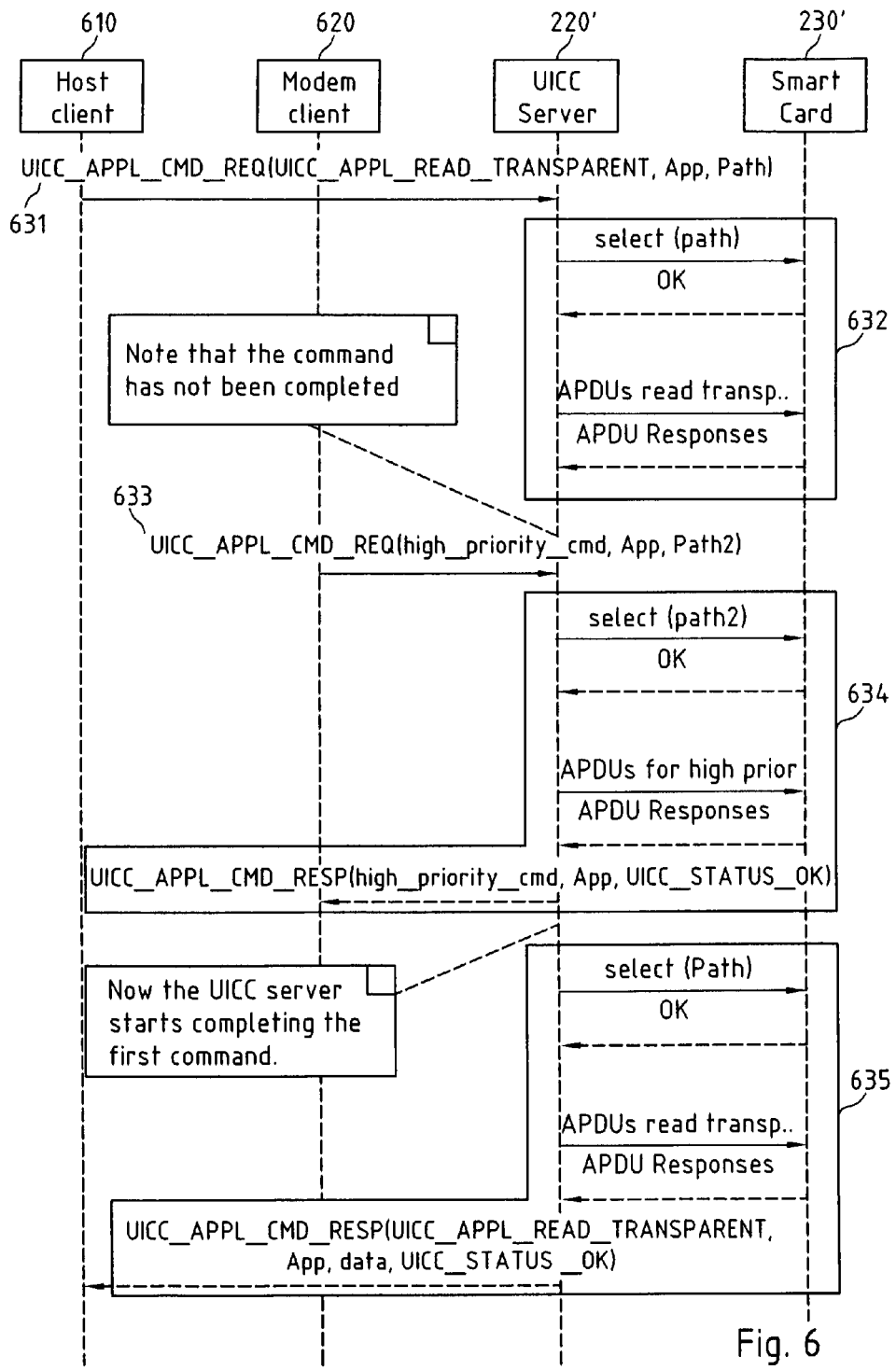
FIG. 6 depicts an example message sequence diagram according to exemplary embodiments of the present invention.

FIG. 6 depicts an example message sequence diagram according to exemplary embodiments of the present invention showing an interleaving for the exemplary system depicted in FIG. 2*b*.

The modem client 620 may be associated with the modem server 241 and one of the clients 211, 213, 214, and the host client 610 may be associated with the application server 251 and one of the clients 212, 215, 216, whereas the smart card unit 230' represents an UICC and the server entity 220' represent an UICC server 220'.

At first, the host client 610 transmits an access request 631 for a first application to the smart card, for example to the interface 221' of the UICC server 220'. The host client 610 believes that it communicates with the smart card 230'. A local channel to the smart card is selected and first APDUs are transmitted for the access of the first application, as indicated by reference sign 632 in FIG. 6.

Now the UICC server 220' receives an access request 633 for accessing a second application, wherein this access request has a high priority in accordance with the access rules. Note that the command with respect to the first access has not been completed at this point in time. Interleaving of accessing the first application my be performed due to the higher priority of the access request 633 for accessing the second application, so that accessing the second application may be performed immediately, as indicated by reference sign 634. After accessing the second application may be finished, the UICC server 220' starts completing the first application, for example the first command (reference sign 635).

Figure 7:
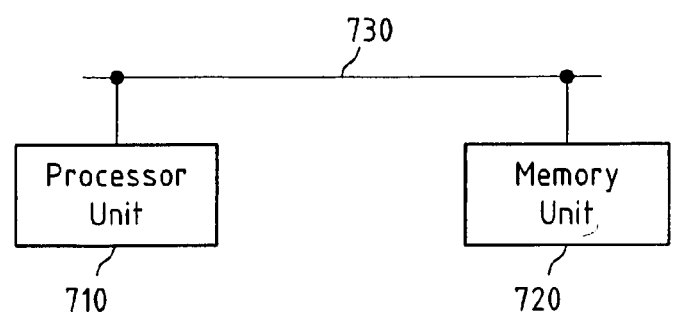
FIG. 7 depicts a schematic block diagram of another exemplary embodiment of an apparatus of the present invention.

FIG. 7 depicts a schematic block diagram of another exemplary embodiment of an apparatus of the present invention.

In this exemplary embodiment, the sever entity 220, 220' is implemented on a processor unit 710, and the processor unit 710 is coupled with a memory unit 720. For instance, as indicated in FIG. 7, the processor unit 710 may be coupled to the memory unit 720 via a bus 730, but any other connection between processor unit 710 and memory unit 720 may also be applied. As an example, processor unit 710 and memory unit 720 may be implemented on a single one chip.

The processor unit 710 may be configured to be coupled to an interface in order to communicate with the smart card unit and it may be configured to be coupled to another interface, for example 221, 211', in order to communicate with said at least two clients. As a non-limiting example, the processor unit 710 may be configured to communicate via a bus system with one of these interfaces in order to perform the communication with the smart card unit and/or the at least one client, wherein this bus system may represent the bus 730 or another bus.

The server entity 220, 220' implemented in the processor unit 710 is configured to store information in the memory unit 720, wherein this information may represent information being related to an access of a client to an application on the smart card unit 230, 230'. Thus, in case the server entity 220, 200' receives an access request from another client and the requested information is already stored in the memory unit 720, the server entity 220, 220' may be configured to readout this requested information from the memory unit 730 in order to send it to the client. Accordingly, in this case the server entity 220, 220' may use the stored information instead of accessing the smart card unit.

Thus, a request from one of the client to the server entity 220, 220' may not be passed to the smart card unit 230, 230' as it may be handled directly in the server entity 220, 220'.

It is readily clear for a skilled person that the logical blocks in the schematic block diagrams as well as the flowchart and algorithm steps presented in the above description may at least partially be implemented in electronic hardware and/or computer software, wherein it depends on the functionality of the logical block, flowchart step and algorithm step and on design constraints imposed on the respective devices and/or apparatuses to which degree a logical block, a flowchart step or algorithm step is implemented in hardware or software. The presented logical blocks, flowchart steps and algorithm steps may for instance be implemented in one or more digital signal processors, application specific integrated circuits, field programmable gate arrays or other programmable devices. Said computer software may be stored in a variety of storage media of electric, magnetic, electro-magnetic or optic type and may be read and executed by a processor, such as for instance a microprocessor. To this end, said processor and said storage medium may be coupled to interchange information, or the storage medium may be included in the processor.

The invention has been described above by means of exemplary embodiments. It should be noted that there are alternative ways and variations which are obvious to a skilled person in the art and can be implemented without deviating from the scope and spirit of the appended claims. In particular, the invention is not restricted to USIM/SIM but can be applicable to any other systems where at least two clients wants to have access to at least one application on a smart card unit.

What is claimed is:

1. A method, comprising:
receiving an access request for at least one application located on a smart card unit, wherein the request is received from one client of at least two clients;
checking whether the at least one application located on the smart card unit is already active;
activating the at least one application located on the smart card unit when the application is not active;
sharing access to the at least one application located on the smart card unit for the at least two clients in parallel, wherein sharing access is granted according to access rules, wherein the one client of the at least two clients has a higher priority than the remaining clients of the at least two clients, and wherein access to the at least one application can be performed by at least one of: referencing the application explicitly and referencing the application implicitly;
receiving a deactivate request for the at least one application from the one client of the at least two clients;

checking whether access to the at least one application is shared with at least one other client of the at least two clients; and deactivating the at least one application when there is no other client sharing the at least one application located on the smart card.

2. The method of claim 1, comprising:

exposing a common interface for the at least two clients to handle the access request.

3. The method of claim 1, wherein when the at least one application is active, the sharing access is provided to the at least one application for the one client.

4. The method of claim 1, wherein the activating the at least one application is only performed when the number of active applications does not exceed a maximum number of applications.

5. An apparatus, comprising:

at least one processor circuitry; and at least one memory circuitry including computer program code, the at least one memory circuitry and the computer program code configured to, with the at least one processor circuitry, cause the apparatus to perform at least the following:

receive an access request for at least one application located on a smart card unit, wherein the request is received from one client of at least two clients;

check whether the at least one application located on the smart card unit is already active;

activate the at least one application located on the smart card unit when the application is not active;

share access to the at least one application located on the smart card unit for the at least two clients in parallel, wherein sharing access is granted according to access rules, wherein the one client of the at least two clients has a higher priority than the remaining clients of the at least two clients, and wherein access to the at least one application can be performed by at least one of: referencing the application explicitly and referencing the application implicitly;

receive a deactivate request for the at least one application from the one client of the at least two clients;

check whether access to the at least one application is shared with at least one other client of the at least two clients; and deactivate the at least one application when there is no other client sharing the at least one application located on the smart card.

6. The apparatus of claim 5, comprising:

a common interface configured to handle the one access request.

7. The apparatus of claim 5, wherein when the at least one application is active, the sharing is provided to the at least one application for the one client.

8. The apparatus of claim 5, wherein activating the one application is only performed when the number of active applications does not exceed a maximum number of applications.

9. The apparatus of claim 5, wherein the at least one application represents at least two applications, and wherein an application being currently accessed represents a first application, wherein the apparatus is configured to interleave access of the first application in case of receiving an access request for a second application of said at least two applications having a higher priority.

10. The apparatus of claim 9, wherein the interleaving comprises:

stop access of the first application;

access the second application; and restart access of the first application when the second application is finished.

11. The apparatus of claim 5, wherein a first client of the at least two clients represents a modem client of a modem engine and a second client of the at least two clients represents a host client of an application engine.

12. The apparatus of claim 5, wherein the apparatus is configured to track currently selected file information of an accessed application.

13. The apparatus of claim 5, wherein one application of the at least one application represents a telecom telecommunications application.

14. The apparatus of claim 5, wherein the smart card unit represents a universal integrated circuit card.

15. A non-transitory computer-readable storage medium including computer program code, which when executed by at least one processor circuitry causes operations comprising:

receiving an access request for at least one application located on a smart card unit, wherein the request is received from one client of at least two clients;

checking whether the at least one application located on the smart card unit is already active;

activating the at least one application located on the smart card unit when the application is not active;

sharing access to the at least one application located on the smart card unit for the at least two clients in parallel, wherein sharing access is granted according to access rules, wherein the one client of the at least two clients has a higher priority than the remaining clients of the at least two clients, and wherein access to the at least one application can be performed by at least one of: referencing the application explicitly and referencing the application implicitly;

receiving a deactivate request for the at least one application from the one client of the at least two clients;

checking whether access to the at least one application is shared with at least one other client of the at least two clients; and deactivating the at least one application when there is no other client sharing the at least one application located on the smart card.

\* \* \* \* \*